(12) United States Patent
Ruehr et al.

(10) Patent No.: US 8,236,178 B2
(45) Date of Patent: Aug. 7, 2012

(54) REVERSE OSMOSIS WATER RECOVER METHOD

(75) Inventors: Thomas A. Ruehr, Moraga, CA (US); Evelyn Ruehr, legal representative, Los Osos, CA (US); Terry R. Gong, Moraga, CA (US)

(73) Assignee: Earth Renaissance Technologies, LLC, Salt Lake City, UT (US)

(*) Notice: Subject to any disclaimer, the term of this patent is extended or adjusted under 35 U.S.C. 154(b) by 407 days.

(21) Appl. No.: 12/583,102

(22) Filed: Aug. 14, 2009

(65) Prior Publication Data
US 2010/0018921 A1    Jan. 28, 2010

Related U.S. Application Data

(63) Continuation-in-part of application No. 11/894,214, filed on Aug. 20, 2007, now abandoned.

(51) Int. Cl.
C02F 1/44      (2006.01)
B01D 65/02    (2006.01)
C09K 17/14    (2006.01)

(52) U.S. Cl. .............. 210/636; 47/58.1 SC; 210/724; 210/652

(58) Field of Classification Search .......... 210/636, 210/724, 652; 47/58.1 SC
See application file for complete search history.

(56) References Cited

U.S. PATENT DOCUMENTS

| | | | | |
|---|---|---|---|---|
| 3,827,976 A * | 8/1974 | Stana et al. | ............... | 134/22.16 |
| 5,418,466 A * | 5/1995 | Watson et al. | ............... | 324/668 |
| 5,501,798 A * | 3/1996 | Al-Samadi et al. | ........... | 210/652 |
| 6,071,414 A * | 6/2000 | Kishi | ........................... | 210/652 |
| 6,096,223 A * | 8/2000 | El-Shoubary et al. | ........ | 210/720 |
| 6,113,797 A * | 9/2000 | Al-Samadi | ..................... | 210/652 |
| 6,468,430 B1 | 10/2002 | Kimura et al. | | |
| 6,651,383 B2 * | 11/2003 | Grott | ........................ | 47/58.1 SC |
| 6,743,363 B2 | 6/2004 | Kimura et al. | | |
| 6,979,116 B2 | 12/2005 | Cecala et al. | | |
| 7,060,136 B1 | 6/2006 | Zeiher et al. | | |

(Continued)

FOREIGN PATENT DOCUMENTS

EP     1312408 A2 *    5/2003

(Continued)

OTHER PUBLICATIONS

Marchuk, Alla G. and Rengasamy, Pichu, "Cation Ratio of Soil Structural Stability," 2010 19th World Congress of Soil Science, Soil Solutions for a Changing World, Aug. 1-6, 2010, Brisbane, Australia. Accessed on the Internet at http://www.iuss.org/19th%20WCSS/Symposium/pdf/WG3.4.pdf, May 26, 2012.*

(Continued)

*Primary Examiner* — Nam Nguyen
*Assistant Examiner* — Denise R Anderson
(74) *Attorney, Agent, or Firm* — Marcus G. Theodore

(57) ABSTRACT

A method for cleaning and maintaining reverse osmosis membrane filters by injecting sulfurous acid into water to form sulfurous acid ($H_2SO_3$), and then sequentially filtering the acidified water through membrane filters to reduce alkalinity and mineral scaling, add sufficient $SO_2$ as a biocide to attack bacteria and other micro organisms to prevent membrane fouling, reduce iron to prevent iron deposit build-up, scavenge and remove dissolved oxygen prior to filtration to prevent membrane oxidation, and prevent concentrated salts within the retentate from precipitating out of solution during transport for land application.

13 Claims, 4 Drawing Sheets

U.S. PATENT DOCUMENTS

| | | |
|---|---|---|
| 7,147,361 B2 | 12/2006 | Cecala et al. |
| 7,165,561 B2 | 1/2007 | Baldridge et al. |
| 7,220,358 B2 | 5/2007 | Schacht et al. |

FOREIGN PATENT DOCUMENTS

| | | | |
|---|---|---|---|
| JP | 63039686 | * | 2/1988 |
| JP | 63039686 | | 2/1998 |

OTHER PUBLICATIONS

New South Wales Department of Primary Industries, "Cation Exchange Capacity," reviewed Aug. 16, 2002. Accessed on the Internet at http://www.dpi.nsw.gov.au/agriculture/resources/soils/structure/cec, Apr. 6, 2012.*

Camberato, James J., "Cation Exchange Capacity—Everything You Want to Know and Much More," First printed in South Caroline Turfgrass Foundation News, Oct.-Dec. 2001.*

Ross, D. 1995. Chapter 9, Recommended Methods for Determining Soil Cation Exchange Capacity. p. 62-69. In J.T. Sims and A. Wolf (ed.) Recommended soil testing procedures for the northeastern United States. Northeast Regional Bull. 493. Agric. Exp. Stn., Univ. of Delaware, Newark, DE.*

Tammarith, Wittaya, "Remediation of Salt-Contaminated Soil From an Abandoned Shrimp Farm," thesis from the University of Regina, Saskatchewan, pp. 4-8, Dec. 2001.*

* cited by examiner

REVERSE OSMOSIS WATER RECOVER METHOD

RELATED APPLICATIONS

This application is a continuation-in-part of prior application Ser. No. 11/894,214, filed Aug. 20, 2007 now abandoned, entitled "TREATMENT METHOD FOR REVERSE OSMOSIS FILTRATION SYSTEMS

BACKGROUND OF THE INVENTION

1. Field

This invention pertains to maintenance and operation methods to clean and operate reverse osmosis filtration systems. In particular it pertains to a method utilizing sulfurous acid to reduce scaling and microbial buildup on reverse osmosis membranes to improve their performance to provide product water filtrate, and monitor and condition the brine retentates to prevent mineral scaling within discharge conveyance systems, and to allow the recovery of a brine retentate reject water and steam and make them suitable for land application.

2. State of the Art

Reverse osmosis is a separation process using pressure to force a solvent through a membrane retaining the solute on one side and allowing the pure solvent to pass to the other side. More formally, it is the process of forcing a solvent from a region of high solute concentration through a membrane to a region of low solute concentration by applying a pressure in excess of the osmotic pressure. This is the reverse of the normal osmosis process, which is the natural movement of solvent from an area of low solute concentration, through a membrane, to an area of high solute concentration when no external pressure is applied. The membrane here is semi permeable, meaning it allows the passage of solvent but not of solute.

Reverse osmosis thus operates using a membrane separation process for removing solvent from a solution. When a semi permeable membrane separates a dilute solution from a concentrated solution, solvent crosses from the dilute to the concentrated side of the membrane in an attempt to equalize concentrations. The flow of solvent can be prevented by applying an opposing hydrostatic pressure to the concentrated solution. The magnitude of the pressure required to impede completely the flow of solvent is defined as the "osmotic pressure". If the applied hydrostatic pressure exceeds the osmotic pressure, flow of solvent will be reversed, whereby solvent will flow from the concentrated to the dilute solution. This phenomenon is referred to as Reverse Osmosis.

In order to use reverse osmosis as a water purification process, the feed water is pressurized on one side of a semi permeable membrane. The pressure must be high enough to exceed the osmotic pressure to cause reverse osmotic flow of water. If the membrane is highly permeable to water, but essentially impermeable to dissolved solutes, pure water crosses the membrane and is known as product water. As product water crosses the membrane, the concentration of dissolved impurities increases in the remaining feed water (a condition known as concentration polarization) and, as a consequence, the osmotic pressure increases proportional to the concentrations of the constituents.

The osmotic pressure ($\pi$) of a solution can be determined experimentally by measuring the concentrations of dissolved salts in the solution. The osmotic pressure is obtained from the following equation.

$$\pi = RT\Sigma Xi$$

Where $\pi$ is the osmotic pressure in kilopascals (kPa)

T is the temperature in Kelvin

R is the Universal gas constant equal to 8.314 kPa m$^3$/kg mol K $\Sigma Xi$ is the concentration of all constituents in a solution in kg mol/m$^3$ A point is reached where the applied pressure is no longer able to overcome the osmotic pressure and no further flow of product water occurs. Moreover, if the applied pressure is increased in an attempt to gain more product water, a point is reached when the membrane becomes fouled by precipitated salts and other undissolved material from the water. Therefore, a limit exists as to the fraction of feed water recoverable as pure water and reverse osmosis units are operated in a configuration where only a portion of the feed water passes through the membrane with the remainder being directed to drain (cross-flow configuration).

The water flowing to drain contains concentrated solutes and other insoluble materials, such as bacteria, endotoxin and particles, and is referred to as the reject stream. The product water to feed water ratio can range from 10% to 50% for purification of water depending on the characteristics of the incoming water plus other conditions.

The membranes used for reverse osmosis have a dense barrier layer in the polymer matrix where most separation occurs. In most cases the membrane is designed to allow only water to pass through this dense layer while preventing the passage of solutes (such as salt ions). This process requires a high pressure be exerted on the high concentration side of the membrane, usually 2-17 bar (30-250 psi) for fresh and brackish water, and 40-70 bar (600-1000 psi) for seawater, which has around 24 bar (350 psi) natural osmotic pressure which must be overcome.

A reverse osmosis membrane must be freely permeable to water, highly impermeable to solutes, and able to withstand high operating pressures. It should ideally be tolerant of wide ranges of pH and temperature and should be resistant to attack by chemicals including free chlorine and by bacteria. Ideally, it should also be resistant to scaling and fouling by contaminants in the feed water. Three major types of reverse osmosis membranes: cellulosic, fully aromatic polyamide, and thin film composite. A comparison of characteristics of these three membrane types is shown below.

| Comparison of Reverse Osmosis Membranes | | | |
|---|---|---|---|
| Features | Cellulosic | Aromatic Polyamide | Thin Film Composite* |
| Rejection of Organic | Low | Medium | High |
| Rejection of Low Molecular Weight | | | |

-continued

Comparison of Reverse Osmosis Membranes

| Features | Cellulosic | Aromatic Polyamide | Thin Film Composite* |
|---|---|---|---|
| Organic Compounds | Medium | High | High |
| Water Flux | Medium | Low | High |
| pH Tolerance | 4-8 | 4-11 | 2-11 |
| Maximum Temperature Stability | 35° C. | 35° C. | 45° C. |
| Oxidant Tolerance e.g. free Chlorine | High | Low | Low |
| Compaction Tendency | High | High | Low |
| Biodegradability | High | Low | Low |
| Cost | Low | Medium | High |

*Thin film composite type having polyamide surface layer

Cellulosic Membranes were first used in the late 1950s with cellulose acetate membranes. These membranes are asymmetric, composed of a thin dense surface layer (0.2 to 0.5~m) and a thick porous substructure. Solute rejection is accomplished by the thin dense layer and the porous substructure provides structural strength. Cellulose acetate membranes can be cast in sheets or as hollow fibers. Cellulose acetate membranes are inexpensive and easy to manufacture but suffer from several limitations. Their asymmetric structure makes them susceptible to compaction under high operating pressures, especially at elevated temperatures. Compaction occurs when the thin dense layer of the membrane thickens by merging with the thicker porous substructure, leading to a reduction in product flux. Cellulose acetate membranes are susceptible to hydrolysis and can only be used over a limited pH range (low pH 3 to 5 and high pH 6 to 8, depending on the manufacturers). They also undergo degradation at temperatures above 35° C. They are also vulnerable to attack by bacteria. Cellulose acetate membranes have high water permeability but reject low molecular weight contaminants poorly. Cellulose triacetate membranes have been developed with improved salt rejection characteristics and reduced susceptibility to pH, high temperature and microbial attack. However, cellulose triacetate membranes have lower water permeability than cellulose acetate membranes. Blends of cellulose triacetate and cellulose acetate have been developed to take advantage of the desirable characteristics of both membranes.

Aromatic polyamide membranes were first developed by DuPont in a hollow fiber configuration. Similar to the cellulosic membranes, these membranes have an asymmetric structure with a thin (0.1 to 1.0 μm) dense skin and a porous substructure. Polyamide membranes have better resistance to hydrolysis and biological attack than do cellulosic membranes. They can be operated over a pH range of 4 to 11, but extended use at the extremes of this range can cause irreversible membrane degradation. They can withstand higher temperatures than cellulosic membranes. However, similar to cellulosics, they are subject to compaction at high pressures and temperatures. They have better salt rejection characteristics than cellulosic membranes plus better rejection of water soluble organic compounds. A major drawback of polyamide membranes is they are subject to degradation by oxidants, such as free chlorine.

Thin film composites (TFC) are membranes made by forming a thin, dense, solute rejecting surface film on top of a porous substructure. The materials of construction and the manufacturing processes for these two layers can be different and optimized for the best combination of high water flux and low solute permeability. The water flux and solute rejection characteristics are predominantly determined by the thin surface layer, whose thickness ranges from 0.01 to 0.1 micrometers. Several types of thin film composite membranes have been developed, including aromatic polyamide, alkyl-aryl poly urea/polyamide and polyfurane cyanurate. The supporting porous sub layer is usually made of polysulfone. Polyamide thin film composites similar to polyamide asymmetric membranes are highly susceptible to degradation by oxidants, such as free chlorine. Consumers must be consistent in their maintenance of the TFC systems, particularly the carbon pre filtration element essential to be present to remove free chlorine (and other oxidative organic compounds) and prevent damage and premature destruction of the TFC membrane. Although the stability of these membranes to free chlorine has been improved by modifications of the polymer formulation and the processing technique, exposure to oxidants must be minimized.

Reverse osmosis membranes reject dissolved inorganic solutes, larger organic solutes (molecular weight greater than 200), a portion of microbiological contaminants such as endotoxin, viruses and bacteria, and particles. Because of this broad spectrum of solute rejection, reverse osmosis is an important process in a wide variety of water treatment processes. The removal of inorganic contaminants by reverse osmosis membranes has been studied in great detail by many researchers using a variety of membrane types. Complex interactions occur in feed waters containing mixtures of ionic species. Nevertheless, general guidelines for the rejection of inorganic contaminants by reverse osmosis membranes can be given:

Ionic contaminants are more readily rejected than neutral species. For most membrane types, polyvalent ions are rejected to a greater extent than monovalent ions. If the polyvalent ion is strongly hydrated, rejection is even higher. An example of this interaction is that of sodium. Sodium as sulfate ($Na_2SO_4$,) has a higher rejection than when present as sodium chloride (NaCl), because the divalent sulfate ion is rejected to a greater extent than the monovalent chloride ion.

Because electrical neutrality must be preserved, ions diffuse across the membrane as a cation-anion pair. As a consequence, rejection of a particular ion depends on the rejection of its counter ion. Variations in pH influence the water flux and rejection characteristics of reverse osmosis membranes exposed to a mixture of monovalent and polyvalent solutes. This effect of pH varies with membrane composition and ionic species. For example, fluoride rejection increases from 45% to 90% as pH increases from 5.5 to 7.2, whereas nitrate rejection decreases slightly as pH increases from 5.2 to 7.0. In instances when pH has exceeded 9, and the water contained chloramines, a decreased rejection of solutes by polyamide thin film composite membranes has been observed.

High pH causes chloramines to dissociate into ammonium and hypochlorite ions. The ammonium ions are poorly removed by activated carbon, and interact with the polyamide membranes, causing their rejection characteristics to deteriorate. The decrease in rejection can generally be reversed by lowering the pH of the water supply. Larger municipal water systems are now using chloramines to treat water instead of using free chlorine. This dramatically reduces membrane performance and product life. Inorganic contaminants with higher molecular weights (greater than 200) are rejected to a greater extent than small molecular weight inorganic solutes.

The variable to poor removal characteristics of organic compounds via reverse osmosis membranes dictates the use of auxiliary carbon filtration components either before or after (or both) the membrane. As in steam distillation having similar problems with organic materials, both reverse osmosis and distillation require some type of organic removal mechanism such as replaceable carbon filters. The placement of carbon filters in reverse osmosis systems depends on the type of membrane in use: for cellulose acetate or cellulose triacetate membranes the carbon element is usually placed after the membrane and captive air tank, and immediately before the dispensing faucet. For thin film membranes, a carbon filter is usually placed before and after the membrane. The carbon filter placed in front of the membrane is necessary since various types of organic materials and chlorine are detrimental to the structure of the thin film membrane. Extra caution must be taken regularly to replace the carbon pre filter ensuring reasonable performance and lifetime for the TFC membrane.

Removal of microbiological contaminants: Reverse osmosis manufacturers claim to reduce levels of bacterial and viral contamination in the feed water by factors of $10^3$ to $10^5$. However, in reality reverse osmosis should not be relied upon to produce sterile, much less water with reduced bacterial levels. Using the biological process called mitosis, bacteria and viruses may rapidly penetrate the reverse osmosis membrane through defects and imperfections in the membrane and through tiny leaks in seals of the membrane module. To prevent microbial colonization of the product water side with bacteria and proliferation of these bacteria, regular disinfection procedures may be necessary.

Reverse osmosis is particularly used for drinking water purification. These drinking water purification systems, including a reverse osmosis step, are commonly used for improving water for drinking and cooking. Such systems typically include four or five stages:

1) a sediment filter to trap particles including rust and calcium carbonate
2) optionally a second sediment filter with smaller pores
3) an activated carbon filter to trap organic chemicals, and chlorine ultimately attacking and degrading TFC reverse osmosis membranes
4) a reverse osmosis (RO) filter being a thin film composite membrane (TFM or TFC)
5) optionally a second carbon filter to capture those chemicals not removed by the RO membrane.
6) optionally an ultra-violet lamp is used for disinfection of any microbes escaping filtration by the reverse osmosis membrane.

In some systems, the carbon pre-filter is omitted and cellulose triacetate membrane (CTA) is used. The CTA membrane is prone to rotting unless protected by the chlorinated water, while the TFC membrane is prone to breaking down under the influence of chlorine. In CTA systems, a carbon post-filter is needed to remove chlorine from the final product water.

Reverse osmosis is used for a variety of water purification processes to treat storm waters, wastewater, desalinate ocean water, and for various industrial applications. In all of these applications, pre-treatment is important when working with RO and nanofiltration (NF) membranes due to the nature of their spiral wound design. The material is engineered to allow only one way flow through the system. Consequently, the spiral wound design doesn't allow for back pulsing with water or air agitation to scour its surface and remove solids. Since accumulated material cannot be removed from the membrane surface systems they are highly susceptible to fouling (loss of production capacity). Therefore, pretreatment is a necessity for any RO or NF system. Pretreatment in Seawater reverse osmosis systems has four major components:

1. Screening of solids. Solids within the water must be removed and the water treated to prevent fouling of the membranes by fine particle or biological growth, and reduce the risk of damage to high-pressure pump components.
2. Screening of biologicals
3. Prefiltration pH adjustment. If the pH of upstream saline water is above 5.8 in the acidic-alkaline measurement scale, sulfuric acid or other acidic solution is used to adjust the pH of water at 5.5 to 5.8.
4. Cartridge filtration. In these reverse osmosis systems, a pump supplies the pressure needed to push water through the membrane, even as the membrane rejects the passage of salt through it. Typical pressures for brackish water range from 225 to 375 lbf/in$^2$ (1.6 to 2.6 MPa). In the case of seawater, they range from 800 to 1,180 lbf/in$^2$ (6 to 8 MPa). The membrane assembly consists of a pressure vessel with a membrane allowing feed water to be pressed against it. The membrane must be strong enough to withstand whatever pressure is applied against it. RO membranes are made in a variety of configurations, with the two most common configurations being spiral-wound and a hollow-fiber. Liming material is used to adjust pH at 6.8 to 8.1 to meet the potable water specifications. Post-treatment consists of stabilizing the water and preparing for distribution. Disinfection (sometimes called germicidal or bactericidal) is employed to kill the bacteria or other organisms in the products by means of ultraviolet radiation, using UV lamps directly on the product.

Prefiltration of high fouling waters with another, larger-pore membrane with less hydraulic energy requirement, has been evaluated and sometimes used since the 1970s. However, this means the water passes through two membranes and is often repressurized, requiring more energy input in the system, increasing the cost. Other recent development work has focused on integrating RO with electro dialysis to improve recovery of valuable deionized products or minimize concentrate volume requiring discharge or disposal.

Typical water treatment using membrane separation employs them in a series of sequential membrane configurations, such as spiral or stacked filtration designs after larger particles have been removed. For example, reverse osmosis membranes are generally employed as the last step after larger particle membrane filtration has occurred. In a conventional water treatment filtration system, particle filtration is first used to remove larger particles. Thereafter successively finer and finer membrane filters are employed to remove finer particles. Membrane pore sizes can vary from 1 to 50,000 angstroms depending on filter type. "Particle filtration" removes particles of 10,000 angstroms or larger. Microfiltration removes particles of 500 angstroms or larger. "Ultrafiltration" removes particles of roughly 30 angstroms or larger. "Nanofiltration" removes particles of 10 angstroms or larger. Reverse osmosis is in the final category of membrane filtration, "Hyperfiltration," and removes particles larger than 1 angstrom.

Reverse osmosis membranes essentially retain the salts and organic compounds and essentially pass only water and molecules in the range of 5 Angstroms (0.005 microns). Since essentially all dissolved and suspended material is rejected by the membrane, the RO permeate is essentially pure water. This sequence is shown below:

lulosic membranes operate at much lower pressures and can tolerate a broad range of pH. In addition, all the advanced formulations are in non-cellulosic membranes. One of the most important characteristics of ion removal membranes is they will reject a certain percentage of ions no matter how high in ion concentration the feed stream is (up to maximum osmotic pressure). This is a significant advantage over ion exchange requiring exchange of every ion it removes. This characteristic virtually mandates inclusion of membrane separation in every ion removal system. It is rarely economically feasible to utilize ion exchange alone for ion removal. The primary decision in applying membrane separation is whether to use a single pass system or a double pass system.

For example, according to Koch Membrane Systems, Inc. (KMS), water can be softened with a nanofiltration (NF) membrane rejecting 85% of salt (sodium chloride) but 99% of the hardness ions (calcium and magnesium). The highest salt

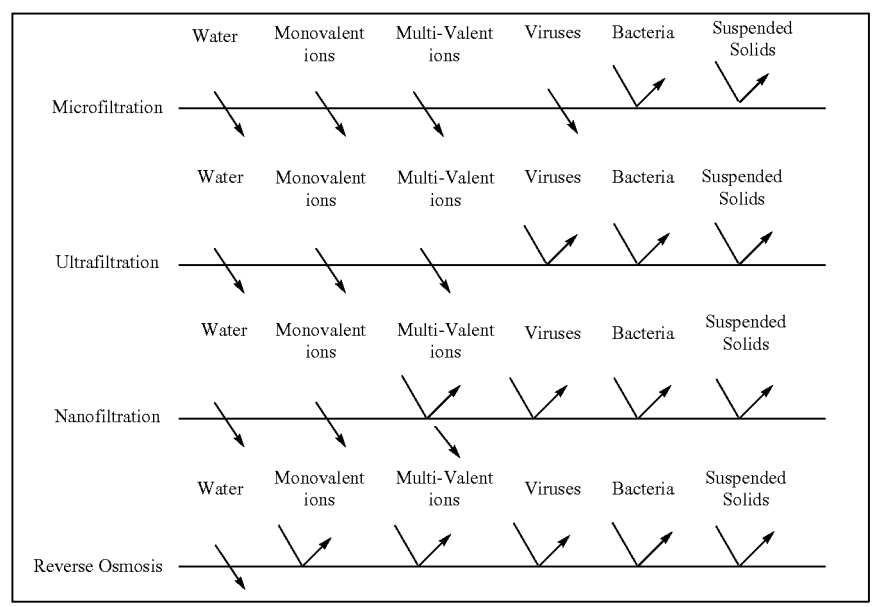

Membranes accomplish a great deal in water purification systems, including: ion removal, particulate removal, removal of organic compounds, and organism removal. Membranes range dramatically in pore size, molecular weight cut off, and ion rejection. Ion removal membranes are at the "tight" end of the spectrum and include reverse osmosis (RO) membranes, and nanofiltration membranes. The membrane chemistry has become refined to allow the rejection percentage to be specified anywhere between 99.9% and 50%, blurring the distinction between nanofiltration, low pressure, standard rejection, and high rejection RO membranes. A major distinction remains between cellulose based and non-cellulosic membranes. Cellulosic membranes tolerate exposure to bactericidal oxidizing agents and in fact must operate with a disinfectant present because organisms will eat the membrane material. Although it may be seen as an advantage to allow a chlorine residual to remain in the water through the reverse osmosis process, the advantages of non-cellulosic membranes far outweigh this advantage. Non-celrejection rates (99.7% or higher), potentially provided by RO membranes, are required for seawater desalinization. KMS reverse osmosis products are designed for cross-flow separation, where a feed stream is introduced into the membrane element under pressure and passed over the membrane surface in a controlled flow path. A portion of the feed passes through the membrane and is called permeate. The rejected materials are flushed away in a stream called the concentrate. Cross-flow membrane filtration uses a high cross flow rate to enhance permeate passage and reduce membrane fouling.

KMS' cross-flow membrane filtration controls the effect of concentration polarization and the gel layer. It provides continuous membrane filtration. Its reverse osmosis process is a moderate to high pressure (80-1200 psig) driven process for separating larger size solutes from aqueous solutions by means of a semi-permeable membrane. This process is carried out by flowing a process solution along a membrane surface under pressure. Retained solutes (such as particulate matter and dissolved salts) leave with the flowing process stream and do not accumulate on the membrane surface. The amount of salt and other impurities is often referred to as TDS, or total dissolved solids. The higher the TDS, the more feed pressure required.

KMS membranes are made with various rejection rates for different applications. KMS produces membrane polymers to cover the full spectrum of recovery osmosis pressure ranges. One of these membrane types is the TFC (thin-film-composite) family. TFC-S ("S" for softening) and TFC-SR ("SR" for selective rejection) are ideal for low TDS or softening type applications. For higher purity permeate, the ULP (ultra-low pressure) line offers high water flux and salt rejection in a 125 psi class membrane.

When salt rejection is paramount, the TFC-HR (high rejection) elements offer 99.5% in standard form, or 99.7% in the Premium model. Typically used in brackish water applications with up to 2000-5000 mg/L TDS, they operate around 200 psi When the water is higher in TDS, the XR (extreme rejection) element comes into its own with 99.7% salt rejection and excellent silica and TOC (total organic carbon) removal too.

For seawater desalination, KMS offers the SS (single-stage) membrane in various sizes and configurations allowing optimum system design. In the Premium line, salt rejection is at least 99.75%. Many of the SS products are designed to run up to 1200 psi for high salinity/high recovery installations.

The cleaning system is an important part of a desalination installation. Membranes can become contaminated after they have been used for some time, with pollutants such as colloids, bio films and biological matter. These contaminants can absorb to the membrane surface and the pipes of the membrane system and consequentially, the performance of the system will decrease. The system may even be seriously damaged. Consequently, a system needs cleaning periodically. Cleaning of a Reverse Osmosis system is usually started when the following conditions are in consecutive order:

1. The normalized flux has decreased 10-15%.

2. The normalized salt content of the permeate has increased 10%.

3. The pressure gradient in a pressure vessel has decreased 15%

The cleaning procedure of a reverse osmosis system consists of the following process steps according to Siemens:

1. Production of the cleansing fluid. The fluids used for the cleaning process need to be of a certain pH and all chemicals must be dissolved and mixed before the cleansing fluid is added in the membrane elements.

2. The removal of feed water from pressure vessels and elements with cleansing fluid.

3. Low-flow recirculation through pressure vessels. The cleansing fluid is now in the drains and the feed water has been forced out of the system.

4. Soaking in the cleansing fluid. The pump is shut off and the cleansing fluid will soak into the membranes.

5. Drainage of the pressure vessels. The applied cleansing fluid is pumped out of the system. By sampling the cleansing fluid and analyzing the samples, one can determine the amount of contamination.

6. Rinsing out the system. For the rinsing process, either permeates or good-quality water is used.

7. Starting up the cleaned system parts. The installation is started up according to the usual process parameters. When cleansing fluid is present in the permeate, the system needs to be rinsed repeatedly, until permeate quality is satisfactory.

Reverse Osmosis membranes and other membrane systems thus need periodic cleaning and servicing. For optimal performance specific chemicals are required, depending on the cause of the pollution. The following are general cleaning problems encountered:

Scaling

Scaling is concerned with the seclusion of suspended inorganic particles, such as calcium carbonate, barium sulfate and iron compounds. This mainly occurs in hard water.

Fouling

Fouling is concerned with the seclusion of organic, colloidal and suspended particles. Bacteria and other microorganisms decomposing these particles will create substrates. As a consequence they will grow and develop forming biofilms on the membrane. In addition, oil and organic accumulation can occur.

Iron Deposits

With waters containing high concentrations of iron, it is periodically necessary to remove iron containing deposits.

These water scaling, fouling, and iron deposit processes will cause a decrease in capacity and/or an increase of the pressure and, as a result, of the energy use. This is due primarily because the filtration process causes these membranes to become plugged with mineral scaling and/or from microbial fouling. And as a result, both have a direct and inverse affect on performance and operational costs—it reduces the volume of water potentially filtered and increases the amount of energy required to process it. In addition to these costs, are the costs related with disposal of the materials collected (brine).

It is thus important to purify the membrane preventively. In many cases regular mild cleaning is better than cleaning periodically with an aggressive cleaning product to insure the membrane will last longer. Reverse osmosis membrane cleaning occurs on and off site. However, both methods are expensive and are to be minimized if possible.

Suda et al. (JP 63039686 A, Feb. 20, 1988—the Derwent abstract, the esp@cenet abstract, uses $SO_2$ for disinfection and reduction of scaling and iron deposits on reverse osmosis filters, but it does not address soil applications and total recovery of the water entering a reverse osmosis system via brine monitoring and conditioning of the retentates to insure the brine levels do not exceed levels for plant irrigation application via $SO_2$ acidity and lime SAR soil adjustments. Suda et al also fails to disclose the need for increased acidity to open up the soil pores.

El-Shoubary et al. (U.S. Pat. No. 6,096,222) issued Aug. 1, 2000 uses phosphoric acid and calcium hydroxide or calcium oxide to adjust the pH of heavy metals contaminated groundwater during the treatment process without increasing the total dissolved solids (TDS). The El-Shoubary et al. method therefore is not designed for use with a reverse osmosis filtration systems as the El-Shoubary et al. strong phosphoric and sulfuric acids are not compatible with many reverse osmosis filters. El-Shoubary et al. is focused on recovering minerals as metallic hydroxide precipitant sludges in a pH range above 7 and preferably 8.3 (Col 3, Lines 24-25).

Depending upon the heavy metal to be removed as metal hydroxides, the pH must be raised from 7 to 11. This resulting alkaline solution is not suitable for treating western alkaline soils where the soil pores are plugged with bicarbonates/carbonates from long irrigation use.

Grott (U.S. Pat. No. 6,651,383) issued Nov. 25, 2003 is a method used with waste water contaminated with greater than 0.15% by weight of the salts of Na, Ca, Mg, Cl, $SO_4$, or $CO_3$ or combinations thereof (Claim 1, Cols 23, 25). Grott addresses the lime treatment of "waste water" defined as "any water containing sufficient salts as to have no acceptable use due to costs or contamination levels" (Col 7, lines 9-13. It therefore is used for treatment of overly concentrated brines unsuitable for irrigating crops.

Kimura et al., U.S. Pat. No. 6,468,430 issued Oct. 22, 2002 discloses a method for inhibiting growth of bacterial or sterilizing a separation membrane using sulfuric acid at a pH of 4 or lower. This Kimura et al. method uses various mineral acids, which increase the ions added to the system, possibly increasing the osmotic pressure of the RO separation system and affecting the brine composition for disposal. Baldridge et al., U.S. Pat. No. 7,165,561 issued Jan. 23, 2007 discloses a biofilm reduction method in cross flow filtration membrane systems using enzyme/surfactant compounds. Kimura et al, U.S. Pat. No. 6,743,363 issued Jun. 1, 2004 discloses a method of bacteristasis or disinfection for preselective membranes using sulfuric acid or similar pre-treatment crude water to make the water have a pH of 4 or lower. The Kimura et al '363 method adds sodium bisulfite for preventing permselective membranes from being degraded by chlorine oxides used for disinfection. This aggravates the saline concentration of the brines by adding more sodium into the reverse osmosis system, which adversely affects their use for land application, and the increased ions may also increase the osmotic pressure of the RO separation system. Schacht et al, U.S. Pat. No. 7,220,358 issued May 22, 2007 discloses a method for treating membranes and separation facilities utilizing multiphase gas/liquid flow cleaning and treatment. The method employs a pre-rinse alkaline wash using caustic, enzymes, surfactants, chlorine and sequestraints; an acid was of nitric, phosphoric, citric acids and surfactants, an alkaline wash using caustic, enzymes, surfactants, chlorine and sequestraints, and a water rinse. Optionally, an antimicrobial treatment with chlorine, peracetic acid, and hydrogen peroxide can be used. In addition a sodium bisulfite, citric acid, and lactic acid preservation may be added to minimize microbial growth. Again, the addition of these added ions may affect the osmotic pressure of the RO separation system, and adversely affect the brine composition of the retentates for disposal purposes.

Cited for general interest is Zeiher et al., U.S. Pat. No. 7,060,136 issued Jun. 13, 2006 disclosing a method of monitoring membrane cleaning process using measurable amounts of inert fluorescent tracers added to a membrane cleaning process stream to evaluate and/or control the removal of contaminants and/or impurities during cleaning.

Acidic treated streams are often amended with gypsum to add calcium; see Cecala et al., U.S. Pat. No. 6,979,116 issued Dec. 27, 2005; and Cecala et al., U.S. Pat. No. 7,147,361 issued Dec. 12, 2006. Gypsum, or calcium sulfate (CaSO4) is a pH neutral material, which will not raise the overall pH of water. Gypsum is primarily used to increase the overall amount of calcium to counter excessive amounts of sodium that may be present in water.

While reverse osmosis water treatment systems do work, the biggest hurdle and drawback is the high cost associated with operating and maintaining such a system and disposing of the brines. Currently, well operated reverse osmosis systems separating sea water produce 1 gallon of concentrated brines for every gallon of pure water filtrate retained. The method described below provides a sulfurous acid pre-treatment method, which reduces membrane fouling to produce a less costly filtrate as the osmotic pressure is reduced by blowing down the brine retentate reject water before it becomes overly concentrated to produce a recovered brine retentates for direct land application to grow vegetation and provide total water recovery.

SUMMARY OF THE INVENTION

Method

The present invention comprises a reverse osmosis water treatment method for recovering all the water treated by reverse filtration systems. It is particularly suited as a pre-treatment method for water undergoing a reverse osmosis purification process to separate unwanted retentate brine materials from sea and other saline waters to provide permeate product passing thru special filtration membranes. The method comprises injecting into the feed water sulfur dioxide at a pH which generates sufficient $SO_2$ to reduce alkalinity scaling conditions, and self agglomerates the solids to minimize adherence to the separation membranes, and disinfects the water to inhibit bacterial growth on the separation membranes. For each mole of $SO_2$ added, one mole of bicarbonate is eliminated as $CO_2$ gas. Thus the net ionic balance of the reverse osmosis membrane system is maintained; thereby maintaining substantially the same osmotic pressure of the reverse osmosis membrane separation system.

Usually the sulfur dioxide gas is generated by oxidation of elemental sulfur for injection and capture into an aqueous solution via water scrubbing of a stream of either unfiltered or pre-filtered water to form sulfurous acid ($H_2SO_3$), which is then re-injected at various locations throughout the reverse osmosis filtration system. The $SO_2$ molecule is less than 2.8 angstroms and therefore passes through each sequential membrane, except the reverse osmosis filtration membranes, providing pre-treatment. This continuous pre-treatment thus avoids the need to clean each membrane separately. Conditioning of the solids is defined as treating the solids with sufficient $SO_2$ allowing them chemically to self adhere to aid in their separation and removal from filtration membranes, but at a level not affecting the permeation characteristics of the membrane. When used to pre-treat wastewater, $SO_2$ conditioning generally results in a color change of the solids from a dark brown to a lighter gray brown color. Similarly, the $SO_2$ treated liquids generally change from a greenish color to a lighter gray brown colloidal suspension color. The malodorous smell of the raw wastewater is replaced by a slight acidic smell. Consequently, the conditioning point for the higher porosity membranes can easily be determined by injecting more and more $SO_2$ into the wastewater until the color and odor changes occur-usually observed at a pH of approximately between 1.5 and 3.

The $SO_2$ thus acts as a surfactant, which aids in removal of films from the filtration membranes. Sulfur dioxide has lone pairs and can act as a Lewis base. It is a strong reducing agent acting as a Lewis acid to provide disinfection without chlorine to minimize membrane growth to extend the life of the filtration membranes. Scaling and fouling are thus significantly reduced ensuring the cleaning of the membranes is needed less frequently. Adding sulfurous acid instead of dangerous concentrated sulfuric acid provides safety while providing equivalent reduction in scaling. Addition of $SO_2$ avoids the addition of calcium, which increases the likelihood of lime scaling such as when calcium hyposulfite is added.

In addition, iron deposits are minimized due to the sulfurous acid acidity and reducing properties.

The basic chemical reactions of $SO_2$ in water are:

$$SO_2+H_2O \Leftrightarrow H_2SO_3 \text{ sulfurous acid}$$

$$H_2SO_3 \Leftrightarrow H^+ + HSO_3^- \text{ bisulfite pK=1.77}$$

$$HSO_3^- \Leftrightarrow H^+ + SO_3^{2-} \text{ sulfite pK=7.20}$$

This means 50% of the $SO_2$ is gas at pH 1.77 and 50% is $HSO_3^-$. In a similar manner, 50% is $HSO_3^-$ and 50% is $SO_3^{2-}$ at pH 7.2. Halfway between pH 7.2 and 1.77 and 1.77 is 5.43 as the pH where all of the sulfur exists as the $HSO_3^-$ form. At a pH of 10.86, all of the sulfur should exist as $SO_3^{2-}$.

Making an aqueous solution too acidic (pH 0) will result in an excess of $SO_2$ gas in solution. This will be the point of maximum biocidal activity. However, this will mean the $SO_2$ gas will be most permeable to the Reverse Osmosis (RO) membranes and most likely to pass through into the RO treated water. This should be avoided since the best operating conditions will presumably be at the point of about pH 5.43 where dominantly $HSO_3^-$ will exist. The acid level is thus selected ensuring the concentration of the $SO_2$ and acid will not adversely affect the permeability of the RO membranes. If $SO_2$ gas does pass through the RO membranes, it can be eliminated by treating the water passing through the RO membranes with a very low concentration of chlorine gas ($Cl_2$). This treatment would not be done while the water is in contact with the RO membranes.

Use of sulfurous acid for disinfection avoids the need for RO membrane treatment with chlorine gas, bleach (active hypochlorous acid HOCl), hydrogen peroxide ($H_2O_2$) or ozone ($O_3$) in attempt to prevent the formation of biofilms. These are very strong oxidizing agents and can destroy some of the organic constituents of the RO membranes in the process. This results in a slow gradual deterioration of the overall operation and functionality of the RO membranes.

The $SO_2$ treated water when adjusted to the appropriate pH (estimated to be approximately 5.43 but probably between pH 5 and 6.5) will be optimally effective in the RO process.

Biofilms are formed usually by various bacteria (some may be by actinomycetes and rarely possibly by fungi or yeasts). These bacteria associate themselves with any solid surface (in this instance the RO membrane). These bacteria grow and reproduce forming a mucous type exudate with a high content of carbohydrates surrounding their cells. This results in the formation of the biofilm on the surface of the membrane.

Strong oxidizing agents are commonly not very effective in removing the biofilm once it forms because these oxidizing agents attack only the surface of the biofilm consisting of the carbohydrate. Seldom does the oxidizing agent penetrate deeply enough to contact and kill these bacteria. It is true, once the biofilm forms, the bacteria are embedded throughout the biofilm mass of carbohydrate. This means the treatment with strong oxidizing agents will destroy some (but very seldom all) of the bacteria causing the biofilm formation.

The use of $SO_2$ treated water for RO membrane maintenance will work in two major ways. First, the $SO_2$ gas will serve as an active biocide. In addition, the oxygen scavenging nature of the sulfur dioxide helps to prevent aerobic microorganisms from obtaining oxygen for their growth. Although anaerobic (no oxygen) microorganisms may be stimulated in the presence of sulfur dioxide treated water, these microbes are susceptible to the biocidal effect of the sulfur dioxide ($SO_2$). This will strongly discourage the initial colonization and growth of any biofilm producing microbe.

Second, the $SO_2$ gas treatment will produce the mild sulfurous acid ($H_2SO_3$) which will ionize to release an active acidic hydronium [$(H_2O)x.H^+$] and effectively react with and eliminate most of the bicarbonate ($HCO_3^-$ ions) from the $SO_2$ gas treated water. In all probability, the formation of biofilms is encouraged by the presence of bicarbonates reacting with calcium ions ($Ca^{2+}$) in the non-acid treated water forming minute deposits of calcium carbonate ($CaCO_3$ or lime deposit) on the RO membranes. This initial deposit will provide an active site for the biofilm producing bacteria to find an initial anchor point. Once this occurs, the biofilm can fully develop. Thus, the $SO_2$ gas treated water prevents formation of the initial lime deposit of $CaCO_3$ and thereby discourages the growth of the biofilm bacteria initiating the biofilm formation. In addition, the biocidal activity of the $SO_2$ gas will reduce the overall growth of the biofilm bacteria.

The exact way the $SO_2$ gas actually inhibits the growth of the bacteria (as a biocidal function) is not completely known at the present time. Sulfur dioxide has both antioxidative and antimicrobial properties. Sulfur dioxide strongly inhibits some microbial activity by denaturing several enzyme systems. The microbial inhibition occurs due to the molecular $SO_2$ molecule and only limited biocidal effect bisulfite ($HSO_3^-$) with no microbial effect due to the sulfite ($SO_3^{2-}$) ion. Similarly, organically bound sulfite has little microbial inhibition, except the aldehyde-bisulfite at >50 mg/L inhibiting some lactic acid bacteria. The molecular $SO_2$ is only present at pH values below 4.0 and its presence increase markedly with lower pH values. Because molecular $SO_2$ has no electrical charge, it is believed to cross cell walls rapidly. At physiological pH values of most cells, the molecular $SO_2$ is rapidly ionized to bisulfite and sulfite. Consequently, at low levels of $SO_2$, microorganisms may be able to survive $SO_2$ treatment. Continued $SO_2$ presence will eventually result in the accumulation of sulfurous acid ($H_2SO_3$) within the cell and cause the cell pH to drop resulting in an increasing presence of molecular $SO_2$ consequently inhibiting cell growth. Thus, the $SO_2$ gas interferes directly with some metabolic function.

The $SO_2$ gas also acts as an oxygen scavenging molecule. This means, any time oxygen gas ($O_2$) exists, the $SO_2$ gas wants to react with the oxygen to oxidize the sulfur to the sulfur trioxide ($SO_3$) gas form, reacting with water to form sulfate ions ($SO_4^{2-}$). This will deprive the aerobic bacteria in the biofilm from having oxygen for normal growth. A wide variety of anaerobic organisms (often poisoned by oxygen because they lack the essential enzymes necessary to remove the oxygen gas) exist naturally and my form biofilms.

If biofilms do form, it is more difficult for the $SO_2$ gas treated water to penetrate the carbohydrate layer protecting these microbes. Therefore, the preferred application of the $SO_2$ gas treated water is pretreatment to prevent initial biofilm formation.

Pretreatment will also result in prolonged life of the RO membranes by preventing their oxidation. This $SO_2$ gas treatment of the water provides a reducing agent, which does not have the damaging effect of oxidizing agents resulting in deterioration of these membranes, which do not have an adverse reaction to the $SO_2$ treatment of the water. Because the sulfurous acid ($H_2SO_3$) is a mild acid, the chances of this sulfurous acid or the associated hydronium ion damaging these RO membranes is much less than using a strong mineral acid in the system.

For natural organic compounds, mild acid treatment can cause a general globular formation of the large organic molecules as they self adhere. This can potentially result in greater water permeability of the RO membranes and increase the efficiency of the RO process. The acid content must be controlled, however, to insure these membranes are not leakier towards the ions the RO process is designed to exclude. As the RO process uses a variety of membranes with varying size and selectivity, not all membranes will act similarly. The acid and $SO_2$ levels must therefore be adjusted to insure that each sequential RO membrane retains its functionality in the presence of the $SO_2$ gas treated water.

The brine water retentate is rejected after the last several sequential membranes at levels suitable for soil conditioning and growing crops. By blowing down the retentate reject water before it becomes overly concentrated, the osmotic pressure is reduced so that the energy costs to operate the reverse osmosis system is reduced. This reject water is generally high quality allowing it to be recycled through the RO membrane process. This will reduce the total amount of brine treated water to be disposed eventually.

To dispose of salt brine retentate reject water from the RO process, the sulfurous acid treatment is neutralized with lime or calcium oxide to a pH that maintains soluble calcium in the brine water, which may be applied to soil to help improve the water penetration. This sulfurous acid calcium pH adjustment treatment method avoids a major problem for the long term water infiltration in current municipal wastewater treatment for recharging aquifers. Current methods do not use acids to neutralize or eliminate the bicarbonates. This lack of treatment results in water containing an abundance of calcium and bicarbonates, forming insoluble calcium carbonate lime deposits, which, if land applied, eventually clog the soil pores with lime deposits. By using $SO_2$ gas treated water, the RO brine will consist of almost no bicarbonate ions. This means the calcium ions will remain in solution. When this brine is disposed on the land surface, the overall effect on the soil will be more of a salt effect, rather than the current condition of excessive sodium causing a sealing of the soil surface.

Microscopic formation of calcium carbonate ($CaCO_3$ lime) can form over the surface of Reverse Osmosis (RO) membranes. Calcium phosphate [$Ca_3(PO_4)_2$] is another substance forming on the surface of RO membranes when normal neutral to higher pH water is pressurized for passage through these membranes. Both are eliminated or reduced greatly by the treatment of the feed water with sulfur dioxide.

During the evaporation of the water from the brine, these same precipitates will form at the surface of the water and reduce the effectiveness of the total evaporation because of the surface covered by these microscopic precipitates. Sulfur dioxide water treatment will effectively reduce or eliminate these surface water formations during evaporation.

The nature of RO membranes provides insight into possible interactions with the sulfur dioxide treatment of the feed water. Most of the membranes have a lower pH tolerance of pH 4. With this in mind, it may be possible to add sufficient sulfur dioxide to form sulfurous acid with a resulting pH of 5. This will allow optimum functioning of the cellulosic and the aromatic polyamide type membranes. The actual pH can be adjusted for different membranes. The thin film composite RO membranes containing a polyamide surface layer can withstand pH 2. The pH could be adjusted downward to pH 4 for these thin film composite RO membranes.

The sulfur dioxide treatment process is not based upon a constant concentration of sulfur dioxide. Instead, the sulfur dioxide addition depends upon the total alkalinity of the water. The system is adjusted to a pre-designated pH value (ideally about pH 5). Thus, the amount of sulfur dioxide injected into the feed water for reverse osmosis will vary depending upon the total alkalinity. The more critical factor is to maintain appropriate pH adjustment. The pH of the feed water can be adjusted for each type of RO membrane. This will insure more optimum functioning of each membrane. Once the initial membrane has removed most of the salts, the water will be essentially non-buffered and the total amount of sulfur dioxide needed will be greatly reduced for the next RO membrane process. Additional sulfur dioxide gas can be added before each additional membrane as needed to assure sufficient sulfur dioxide to inhibit microbial growth and ensure appropriate functioning of each individual membrane.

Thin film composite RO membranes may consist of aromatic polyamides, alkyl and aryl polyurea and polyamides and poly furane cyanurate compounds with poly sulfone. Chemically, these should remain relatively non-effected by the sulfur dioxide treatment.

Chloramines are commonly added in wastewater treatment to eliminate the microbes and viruses. These compounds attack the RO membrane surfaces and cause deterioration over time. Oxidizing agents including chloramines, chlorine gas, bleach (sodium hypochlorite), ozone, hydrogen peroxide or ultra violet light could be used to treat wastewater prior to passage through the RO membranes. This could be used as a microbial treatment prior to contact with the RO membranes. Then, the wastewater could be treated with the sulfur dioxide. The sulfur dioxide will neutralize the oxidation potential of these oxidizing agents. This will prevent the oxidative damage to the RO membranes and prolong the useful life of these membranes.

Effective use of activated charcoal filters both prior to and after RO treatment of the water will enhance the effectiveness of the sulfur dioxide treatment. This is mainly due to the effectiveness of the high surface area of the charcoal filters in removing particles otherwise causing problems with the RO membranes or with water quality.

Concern exists whether some acidity from the sulfurous acid may permeate the RO membranes. If this occurs, the treated purified water can be amended with a very low concentration of calcium hydroxide [$Ca(OH)_2$] or lime [$CaO$]. Any acidity passing through the RO membranes can be neutralized with the added hydroxide. The calcium amount added will be very minor and will probably be beneficial to the total treated water in most instances.

Another concern is the possibility of microbes and especially some viruses to pass through the RO membranes. If this occurs, the treated pure water could be treated with any of the previously cited oxidizing agents once the water is no longer in contact with the RO membranes. If oxidizing chemicals are added, the residual oxidizing chemicals can be neutralized by adding the appropriate amount of sulfur dioxide to the water to balance the oxidation-reduction condition of the treated water. More ideally, ozone or ultra violet light could be used to treat the treated purified water to remove any microorganisms.

Viruses are more likely to agglomerate at a pH of 5. If agglomeration occurs, then the removal of viruses will be enhanced by the use of the sulfur dioxide injection for more effective removal of the viruses by the RO process.

Brine disposal is mitigated by soil application of the sulfur dioxide treatment of the brine water because:

First, the sulfurous acid addition will provide for maintaining soluble salts and will prevent formation of precipitates otherwise form inside soil pores and eventually clog the surface soil preventing further water infiltration and water application to the soil for reclamation.

Second, the bisulfite will be oxidized by the *Thiobacillus* and the *Acidithiobacillus* bacteria in the soil. This will allow the calcium carbonate ($CaCO_3$) commonly existing in western U.S. soils to become dissolved as calcium sulfate ($CaSO_4$) similar to gypsum. The dissolved calcium will flocculate the soil clay and humus particles maintaining the water infiltration rate at the soil surface. The calcium will displace (exchange with) the sodium on the soil cation exchange capacity (CEC) sites. This will allow the sodium salts to move downward with the water and enhance the reclamation of the surface soil.

The reverse osmosis membrane retentate brines are continually monitored for salt concentration build-up and acidity. Before they become too concentrated for land application to raise vegetation, they are conditioned and blown down to adjust the soil conditions for growing crops, such as by adding chemicals, such as lime, or calcium carbonate to adjust the soil SAR along with electrical conductivity of the saturation extract of the soil reported in dS/m to evaluate the effects of these brines for use as irrigation water on soils and plant growth. This monitoring and conditioning of the blow down allows total recovery of the waters treated by reverse osmosis.

Conditioning involves the following adjustments:

a. SAR indicates the relative activity of sodium ions as they react with clay. The Sodium Adsorption Ratio (SAR) is a property of the water phase. The SAR determines the relative hazard caused by applying water having a high SAR to soil. When the SAR is high (>15), more of the sodium (Na+) ions in the solution phase will become adsorbed onto the solid phase (clay minerals and humus) of the soil. This solid phase of clay minerals and humus contains a net negative electrical charge and is termed the soil Cation Exchange Capacity (CEC). As more sodium ions are adsorbed to the solid phase, the soil aggregates composed of large conglomerations of sand, silt, clay and humus particles become destabilized. This condition is termed dispersion, disaggregation or deflocculation. The result is the transformation of the aggregates into their individual sand, silt, clay and humus particles as opposed to the previously aggregated particles. The result of this transformation is the destruction of the soil's ability to transmit air, water and plant roots. As these dispersed silt and clay particles move downward, they cover the previously existing soil pores and effectively block further water infiltration and penetration through the soil.

b. MVCAR. Technically, the SAR should be expanded to include all monovalent cations. Thus, we also use the Mono-Valent Cation. Adsorption Ratio (MVCAR), rather than simply the SAR as a measure of potential hazard of the liquid water phase solution. These monovalent cations normally present in water and soils include sodium (Na+), potassium (K+) and ammonium (NH4+) ions. Municipally treated waste water effluent often has an elevated level of sodium and of ammonium ions. Irrigation of a soil with this type of water (high MVCAR) can cause dispersion, disaggregation, or deflocculation of the soil particles.

c. EC—to insure adequate water infiltration and water permeability through the soil, the Electrical Conductivity (EC) of irrigation water should be brought to greater than 0.3 ds/m or greater than 0.3 mmhos/cm. with the addition of soluble calcium. This prevents deflocculation or dispersion of the soil. When water has been treated to remove all of the major cations [namely, calcium ($Ca^{2+}$), magnesium ($Mg^{2+}$), sodium ($Na^+$), potassium ($K^+$) and ammonium ($NH4^+$) ions], then another problem occurs. As the total salt concentration approaches zero (as occurs when the Electrical Conductivity EC of the water approaches zero), the soil will disperse easily. This condition occurs during Reverse Osmosis (RO) conditions applying pure filtrate for irrigation. The reason for this dispersion is the system must have a relative equilibrium of adsorbed (solid phase) cations and solution phase cations to maintain the stability of the soil aggregates.

The solution to the soil dispersion problem is first to know what the EC and SAR or MVCAR are for a specific water intended for use as irrigation or for use in water recharge of any underground aquifer. It has long been recognized a high SAR or MVCAR can cause this problem. However, the lower the EC of the water used for irrigation, the greater the hazard of using this water. Second, the only way to insure this problem will not manifest itself and prevent dispersion of the soil system is to add additional soluble calcium (Ca2+) ions to the system (regardless of whether the cause is a high SAR or MVCAR or a very low EC in the liquid phase.

The added soluble calcium for this process can be derived from either of two sources. Gypsum (calcium sulfate dihydrate) or calcium carbonated lime plus sulfur dioxide (SO2) forming calcium sulfite reacting to form soluble calcium ions. The soluble calcium ($Ca^{2+}$) ions in the solution phase are attracted to the solid phase CEC sites of the soil particles resulting in flocculation and aggregate stabilization. Failure to amend water applied to soil will result in the eventual destruction of the soil aggregates and cause dispersion, disaggregation and deflocculation.

Note carefully, this hazard can occur under all conditions when the EC is very low (as occurs with rain water, snow melt water or RO treated water). Again, it is critical to increase the level of soluble calcium ($Ca^{2+}$) ions when this very low EC condition occurs in water applied to soil. Irrigation with water having a high ammonium concentration (as occurs with ammonium fertilizer injected into irrigation water) or when municipally treated waste water is irrigated can result in soil dispersion. Again, an adequate concentration of soluble calcium ions must be present to prevent the dispersion, disaggregation or deflocculation of the soil system. The presence of magnesium (Mg2+) ions is insufficient to correct this problem.

Furthermore, a high concentration of bicarbonate and/or carbonate can exacerbate the monovalent cation problem. When bicarbonate and/or carbonate are present, they react with the soluble calcium and magnesium converting these ions into insoluble calcium carbonate and magnesium carbonate. This process removes the required calcium ions from the solution phase. This magnifies the problem because the calcium concentration where it appears in the lower fraction of the SAR or the MVCAR formula. The result is the ratio becomes multiplied as a consequence of this precipitation of previously soluble calcium and magnesium ions. Hence, the SAR measurement was retained in the claims to indicate how the retentates are monitored and adjusted to avoid either very low EC conditions or high SAR conditions.

Also, it is crucial to consider the pH of any soil system to insure the pH is near a value of 6.5 (thereby reducing the problem of high bicarbonate and/or carbonate) and insuring the presence of soluble calcium ions existing in the treated system. Failure to make this pH adjustment will cause precipitation of the calcium carbonate and magnesium carbonate. These insoluble carbonates will form inside the existing soil pores and will eventually plug these pores, thereby inhibiting the subsequent movement of water downward through the soil.

From the SAR, the proportion of sodium on the clay can be estimated when irrigation water has been used for a long period with reasonable irrigation practices. The SAR is a good index of the sodium permeability hazard if water passes through the soil and reaches equilibrium with it. From long experience, if the SAR is less than 3, there should be no problems with either sodium or permeability. In the range of 3 to 9, there are increasing problems. Above 9, severe problems can be expected.

A number of state and federal agencies have surveyed soils and preferred crop conditions throughout the United States. For example, the US Department of Agriculture Agricultural Research Service (USDAARS) has established various soil measurement guidelines. Its laboratory personnel have established criteria for diagnosing saline and sodic soils. Electrical conductivity (EC) of the soil saturation extract was introduced as a practical index of soil salinity. The threshold EC value of 4 dS/m is still used world wide to diagnose and classify saline soils. A threshold of 15 for the exchangeable sodium percentage (ESP) defined as the ratio of sodium (Na+) to the total cation exchange capacity [ESP=((Na+ cmol/kg)/(CEC cmol/kg))*100], indicates soil sodicity and permeability and structural problems.

Key practical diagnostic criteria used to evaluate a water's suitability for irrigation and its potential for degrading soils were developed at the USDAARS Salinity Laboratory. These include electrical conductivity (EC) mentioned above, sodium adsorption ratio (SAR), adjusted SAR, and boron (B) hazard. Electrical conductivity is the universal standard measure of a water's salinity hazard. Sodium adsorption ratio is also a universal standard indicating a water's potential to cause sodic conditions and poor soil structure. Both of these indicators are critical for management decisions and together constitute the basis of a classification system for waters with respect to their salinity and sodicity hazard. Adjusted SAR was developed to correct the measure of sodium hazard for the tendency of calcium carbonate to precipitate from irrigation waters and to improve the appraisal of water quality, predicting potential infiltration problems.

The USDAARS Laboratory has also been at the forefront of determining the boron and salt tolerance of enumerable plant species. One USDAARS Laboratory study quantified all available salt tolerance data by presenting threshold salinity values for yield decrease and linear yield decrease per unit of salinity. Thus a given crop's response to salinity can be describe using only two variables, thereby simplifying the selection of an appropriate crop for waters and soils of a given salinity. Salt tolerance tables, thresholds, and yield responses are provided in all manuals and handbooks dealing with crop production on saline soils and/or with saline waters and are used world-wide.

Salt balance and leaching requirements for water used for irrigation has also been established. The salt balance is the difference between the salt input and the salt output for a given irrigation project, and is used to evaluate the adequacy of drainage facilities, leaching programs, and water requirements for removing salts, and sustaining irrigation in general. This method is still used in monitoring programs by many irrigation projects. The leaching requirement establishes the fraction of irrigation water that must be leached through the root zone to maintain an acceptable level of salinity for cropping purposes. Minimized leaching concepts developed by the USDAARS Laboratory were at the core of the water quality control measures adopted for implementation to control salinity of the Colorado river.

USDAARS Laboratory scientists have been at the forefront in developing reclamation procedures and guidelines for saline and sodic soils. To reclaim saline soils, leaching strategies especially continuous ponding and intermittent ponding were developed by Laboratory scientists and are universally used. To reclaim sodic soils, they pioneered the use of the soil amendments: gypsum, sulfuric acid, sulfur, and calcium chloride to replace exchangeable sodium along with leaching. The gypsum requirement, the amount of amendment required to affect reclamation of a given amount of exchangeable sodium, was developed at the Salinity Laboratory and is the universally-used reclamation standard.

These studies established that plants exhibit differences in salinity tolerance at various growth stages. The information allows a cyclical watering strategy where good quality water was used for growth of sensitive crops during sensitive growth stages, while saline drainage water may be used for the growth of tolerant crops or during tolerant growth stages. The U.S. Bureau of Reclamation and the California Resources Agency have adopted minimized leaching and drainage water reuse concepts to conserve water, minimize drainage volumes, and protect water quality as the heart of the San Joaquin Valley Drainage Program.

In summary, for various soil regions, soil conditions have been identified, which must be adjusted by applying conditioned irrigation waters to meet soil conditions required to grow selected salt sensitive crops. The present RO method is unique in both cleaning and maintaining the sequential RO filters, plus conditioning permeates and separated brines for total water reuse. This is accomplished by carefully monitoring brine levels in the separated brines and discharging them before they become too concentrated for plant usage after adding lime for SAR adjustment. In addition, the brines are acidified to maintain the necessary acidity to break down soil carbonates/bicarbonates to insure soil porosity in a manner previously not employed in RO pretreatment.

Any excess brines not suitable for land application are disposed of using conventional methods.

Apparatus

A preferred pre-treatment apparatus is as follows. Although sulfur dioxide from tanks associated with a contact mixer can be used to acidify the water to be pretreated, a sulfurous acid generator, such as those produced by Harmon Systems International, LLC of Bakersfield, Calif., is preferred as they are designed to produce the $SO_2$ on demand and on an as needed basis. The $SO_2$ is immediately captured in an aqueous form as sulfurous acid ($H_2SO_3$) preventing harmful operator exposure. The sulfur dioxide is injected into the water at a pH between approximately 1.5 and approximately 3.5, depending upon the dwell time required for conditioning and disinfection. At these pH ranges, sufficient $SO_2$ is generated to condition solids for separation, and disinfection and deodorizing wastewater. It was found through testing the Harmon sulfurous acid generator can condition and treat incoming raw wastewater solids to self agglomerate into colloidal self adhering solids which do not adhere to filtration membranes The Harmon sulfurous acid generator has the advantage of generating SO2, as needed, avoiding the dangers of stored SO2 tank storage. However, the main advantage in passing the water directly through the sulfurous acid generator is that it creates and introduces onsite $SO_2$ without adding other compounds or materials such as when using sodium meta-bisulfite and/or potassium meta bisulfite into the system, or additional acid compounds for pH lowering. The method uses both unfiltered and filtered water from the reverse osmosis system itself as the medium to scrub and form the sulfurous acid. Consequently, the treated water volume is not affected.

In one preferred pre-treatment embodiment, the water is fed directly through the Harmon sulfurous acid generator to create concentrated solution of sulfurous acid ($H_2SO_3$), which is then reintroduced and diluting it again into the main body of water prior to filtration. Doing this enhances the reverse osmosis filtration process because: 1.) Sulfurous Acid will neutralize the Total Alkalinity thereby eliminating the mineral scaling problem. 2.) The resulting Bisulfite ($HSO_3^-$) will attack microorganisms within the water to reduce and/or eliminate the microbial fouling problem. 3.) Provide a means in which dissolved oxygen can be scavenged and removed from the water to prevent membrane deterioration. 4.) Since the resultant material will be sulfate ($SO_4^{2-}$), this material can now bond (with other constituents within the water) to form into useful compounds (such as calcium sulfate) having the potential of transforming the brine collected into something desirable and marketable (a calcium rich supplement added to replenish depleted soil environments such as those found in areas of high rainfall and/or calcium deficiency). 5.) To maintain the solubility of retentates and to prevent their precipitation out of solution as it is being conveyed through brine disposal piping systems.

Pre-treating water with $SO_2$/Sulfurous Acid thus results in: longer reverse osmosis membrane filter runs; extended life of all of the sequential filtration membranes as the sulfurous acid molecule is in the range of 2.8 angstroms and passes through all but the last R.O. filter membrane. Its use thus provides reduction in overall maintenance of the entire sequential membrane system; this allows the processing of more water; and the possibility to make the separated brines marketable for use with land applications. All of these factors should lower and make the overall cost per gallon of R.O. filtered water more affordable.

In addition, although the preferred method is for pre-treatment of reverse osmosis membranes, it may be used for cleaning fouled membranes. To clean fouled reverse osmosis membrane filters, sufficient sulfurous acid is injected into water and passed through the membrane filter to reduce alkalinity scaling, add sufficient SO2 as a biocide to attack bacteria and other micro organisms to clean membrane fouling, and reduce iron to prevent iron deposit build-up. The method may therefore be used for pre- and post reverse osmosis membrane treatment.

DESCRIPTION OF THE ILLUSTRATED EMBODIMENTS

Figure 1:
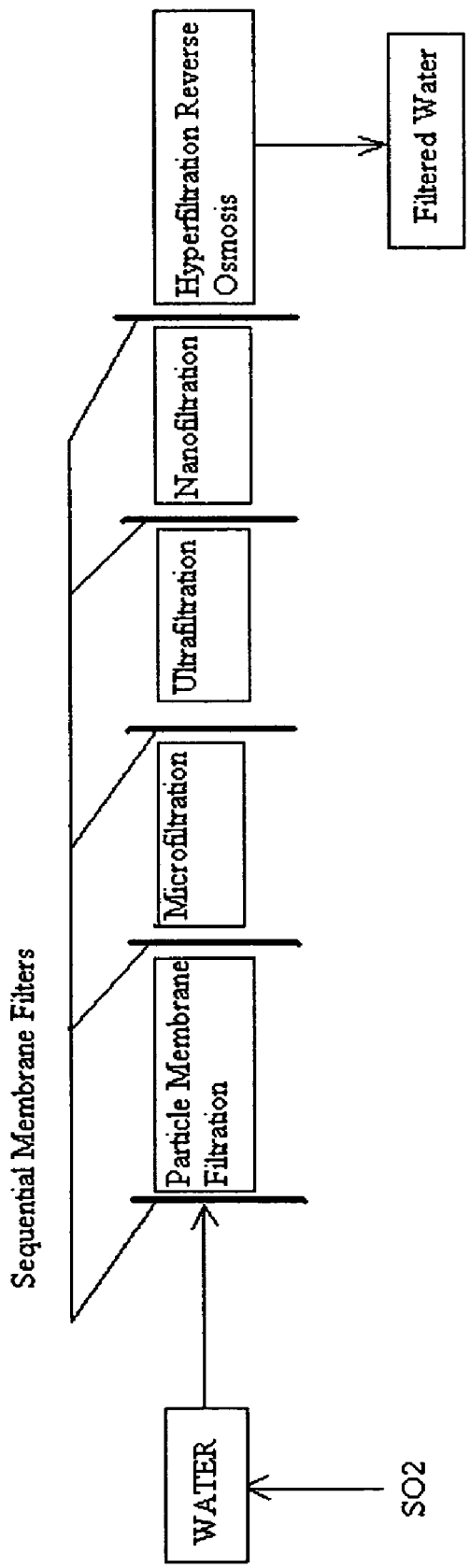
FIG. 1 is a schematic view of a preferred method.

FIG. 1 is a schematic view of a preferred method of the invention. It comprises injecting sufficient sulfurous acid into the water to be sequentially filtered to reduce alkalinity scaling, add sufficient $SO_2$ as a biocide to attack bacteria and other micro organisms to prevent fouling, and to reduce iron to prevent iron deposit build-up. This can be done through a single or multiple injection points and is a method that can provide membrane cleaning benefits to all of the sequential membrane filters (particle membrane filtration), (microfiltration), (ultrafiltration), (nanofiltration), and (hypofiltration). It thus minimizes the need for separate sulfurous acid membrane treatment applications.

The continuous addition of small dosages of sulfurous acid can slow and minimize scaling, biofilm, and iron deposit build-up on the membranes, thereby prolonging their life and filtration effectiveness. As all membranes are continually treated, the membranes may not have to be individually cleaned and replaced at the same time. In addition, the treated filtrate is low in sodium and may be land applied to promote plant growth. If additional calcium is required for saline conditions, the treated filtrate may be conditioned and pH adjusted with lime until the required pH for land application is attained.

Preferably, the remaining concentration of the sulfurous acid in the treated filtrate may be adjusted with lime to provide an increased calcium content of the filtered water to affect a decrease of the Sodium Adsorption Ratio (SAR) to enhance the agronomic condition of the soil to which it is applied. Plants are detrimentally affected, both physically and chemically, by excess salts in some soils and by high levels of exchangeable sodium in others. Soils with an accumulation of exchangeable sodium are often characterized by poor tilth and low permeability making them unfavorable for plant growth. Plant growth is important for mine reclamation for several reasons: (i) it provides an erosion control measure for hill slope erosion and stream bank erosion, (ii) it allows for revegetation of reclaimed areas, and (iii) it can possibly aid in metals uptake by phytoremediation. Sodium adsorption ratios (SAR), along with pH, characterize salt-affected soils. It is an easily measured property providing information on the comparative concentrations of $Na^+$, $Ca^{2+}$, and $Mg^{2+}$ in soil solutions. The equation used to calculate SAR is given as follows:

$$SAR = \frac{[Na^+]}{\sqrt{\frac{1}{2}([Ca^{2+}] + [Mg^{2+}])}}$$

where $[Na^+]$, $[Ca^{2+}]$, and $[Mg^{2+}]$ are the concentrations in mmol/L of sodium, calcium, and magnesium ions (all as single valent equivalents or milliequivalents per Liter) in the soil solution. Concentrations of sodium, calcium, and magnesium are determined by first extracting the ions from the soil into solution. The solution is then analyzed to determine the concentrations of the selected ions. $Na^+$, $Ca^{2+}$, and $Mg^{2+}$ concentrations are commonly determined using atomic absorption spectrometry (AA). The SAR of a soil extract takes into consideration the adverse effect of sodium is moderated by the presence of calcium and magnesium ions. When the SAR rises above 12 to 15, serious physical soil problems arise and plants have difficulty absorbing water according to some studies.

For complete biocidal kill within 10 minutes, sulphurous acid having free SO2 in excess of 5 mg/L is injected at a pH of 1.5 to 3.5. However, the exact free SO2 composition and pH for biocidal kill highly dependent on dwell time. A much higher pH can be employed as the dwell time is extended. The filtered water is then pH adjusted to the required pH for a designated use.

Figure 2:
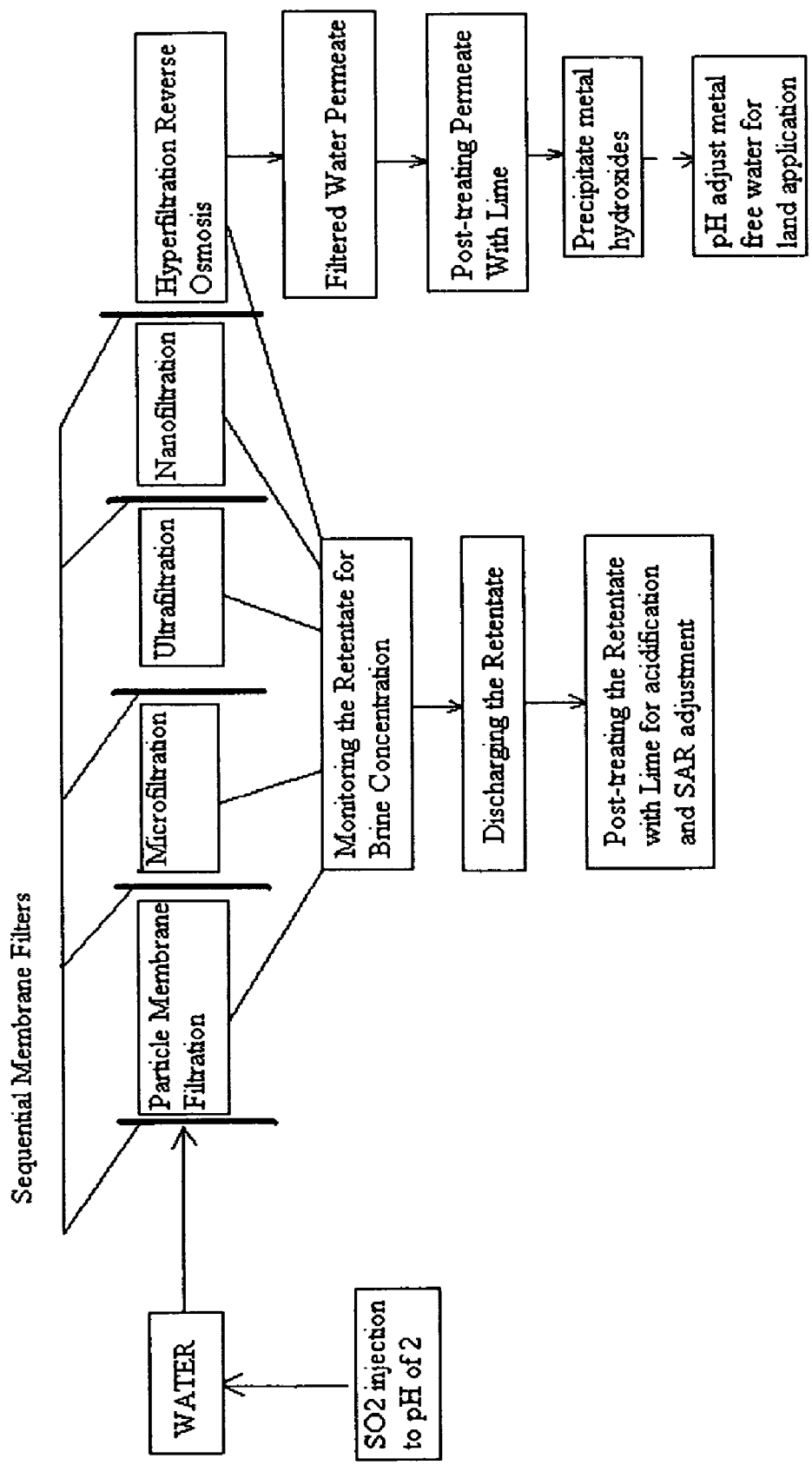
FIG. 2 is a schematic of another preferred method.

FIG. 2 is a schematic view of another preferred method of the invention, wherein heavy metals are acid leached into solution, and removed via liming before pH adjustment for land application, if they have not been removed by the reverse osmosis membrane filters.

Figure 3:
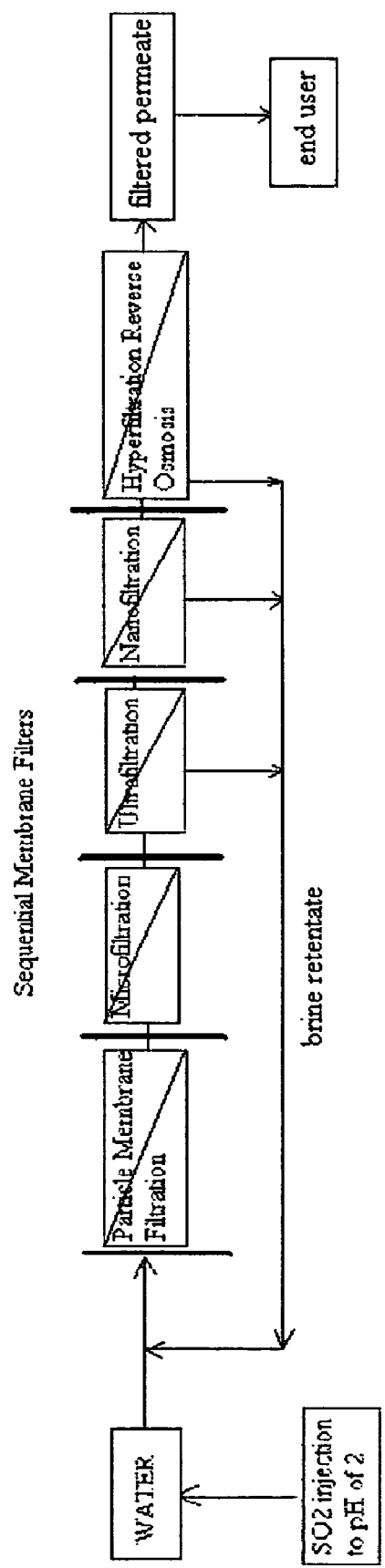
FIG. 3 is a schematic of another preferred method.

FIG. 3 is a schematic of another preferred method wherein the brine retentates from the last sequential filters having a lower concentration of contaminants than the entering water to be reverse osmosis filtered is reinjected into the entering water to be filtered. The lower concentration brine retentates dilute the contaminants in the entering water stream; thereby diluting it allowing additional permeate water to be generated through the reverse osmosis membranes using the same pressure.

Usually, the preferred cleaning and maintenance method is for pre-treatment of the entering water stream to be filtered by reverse osmosis membranes. However, aqueous $SO_2$ (sulfurous acid) may be used for cleaning fouled membranes. To clean a fouled reverse osmosis membrane filters, direct contact with chemicals, biological materials, and accumulation of solids adsorbed by the membrane over time require extra cleaning attention and previously required the use of more aggressive cleaning chemicals. Therefore when processing is interrupted for any significant amount of time, purging feed stock, rinsing and cleaning of the membrane is performed to prevent membrane deterioration. Once placed in service, membranes need to remain wet and should never be allowed to become dry. Back-flushing, a technique often used to clear depth or dead-end filters of cake deposits, will destroy most membranes, except hollow fiber membranes.

A preferred cleaning sequence includes the following steps:

A. Purge and rinse feed stock with plain water,

B. Circulate a $SO_2$ water cleaning solution through the membranes.

C. Remove the SO2 water cleaning solution and rinse,

D. Run a fresh water flux cycle to test for membrane cleanliness and productivity, E. Return to service or treat hold-up liquid to protect membrane in storage.

The plumbing of most reverse osmosis membrane systems will allow for drainage of most of the feed stock. Fresh $SO_2$ water cleaner solution can be used to purge the system of highly concentrated retentate and then circulated to dissolve and remove foulants. Thus, sufficient sulfurous acid at a concentration not adversely affecting the membrane performance is injected into water to treat and pass through the fouled membrane filter to reduce alkalinity scaling, add sufficient $SO_2$ as a biocide to attack bacteria and other micro organisms causing membrane fouling, and reduce iron deposit build-up. The method may therefore be used for pre- and post reverse osmosis membrane treatment.

Figure 4:
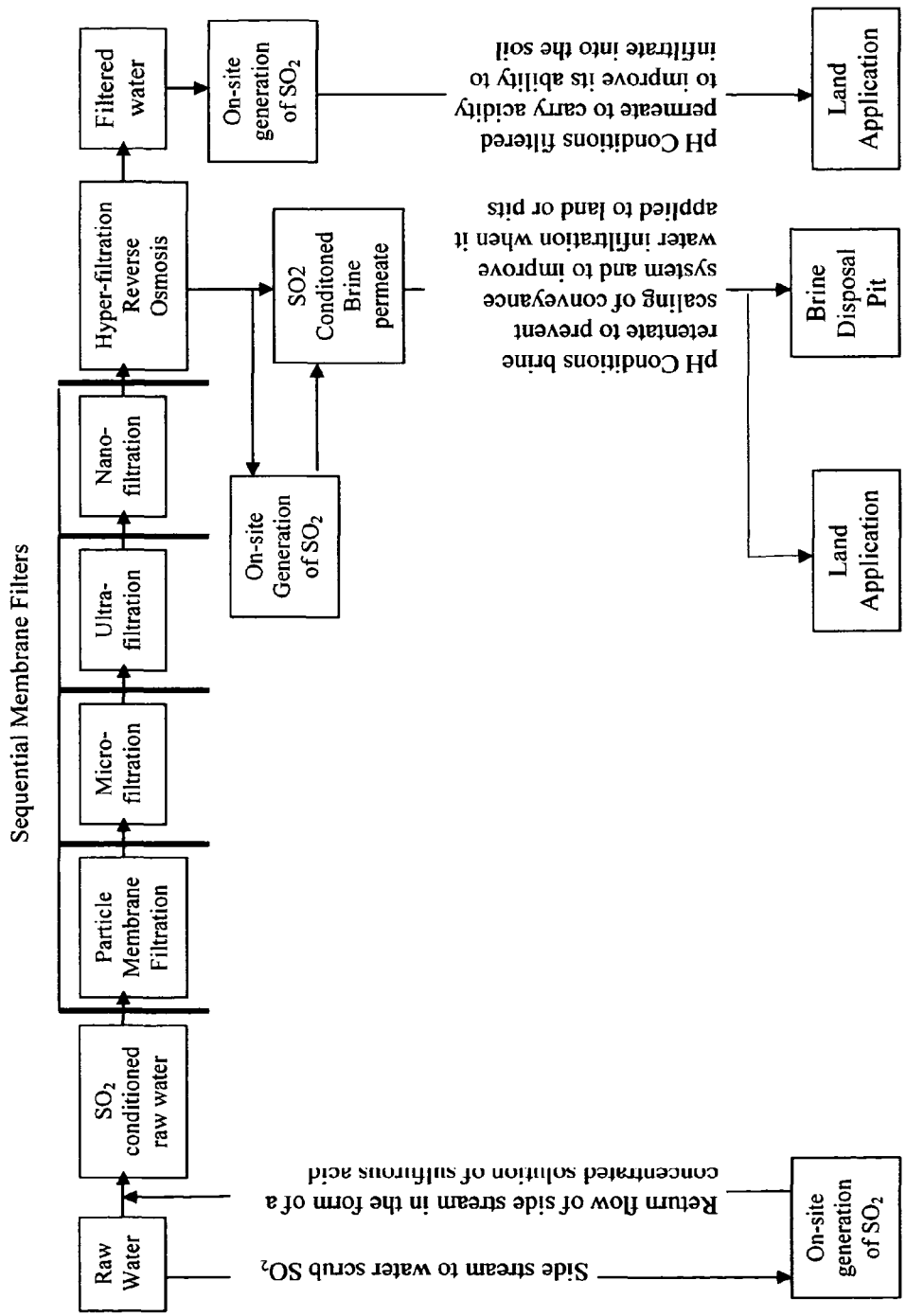
FIG. 4 is a schematic of another preferred method.

FIG. 4 is a schematic of another preferred method. In this sequence, a side stream for the raw water is injected with $SO_2$ preferably generated on-site with a sulfur burner to form sulfurous acid, which is then injected back into the raw water inflows before it enters the sequential membrane filters. The retentate from the last filtration filter is similarly acidified with $SO_2$ generated on-site before land application to improve its soil penetration.

FIG. 4 also shows how retentate from the last filter, which becomes overly concentrated for land application, is diverted to a brine disposal pit and the added sulfurous acid increases the pH of the retentate to prevent scaling of the conveyance system on the way to disposal.

FIG. 4 also shows how the filtered water, when land applied, may be similarly injected with SO2 from an on-site generator to increase its acidity to improve its ability to infiltrate into the soil.

Although this specification has referred to the illustrated embodiments, it is not intended to restrict the scope of the claims. The claims themselves include those features deemed essential to the invention.

We claim:

1. A method for operating reverse osmosis membrane filter systems with membrane filters to recover water by using both the filtrate and brine retentate, comprising:
   a. injecting sulfur dioxide ($SO_2$) into water streams undergoing reverse osmosis filtration at an injection point before reverse osmosis membrane filters sufficient to scavenge and remove dissolved oxygen, serve as a biocide to prevent membrane fouling, reduce alkalinity scaling, and reduce iron deposit build-up on the reverse osmosis membrane filters at a concentration, which will not adversely affect membrane material,
   b. filtering the sulfur dioxide treated water through the reverse osmosis membrane filters to produce a filtrate and separated brine retentate containing less than 0.15% by weight of the salts of Na, Ca, Mg, Cl, $SO_4$, or $CO_3$ or combinations thereof,
   c. adjusting the pH of the filtrate and discharging the same for reuse,
   d. monitoring the brine concentrations of the retentates for at least one of the following:
      i. Sodium Adsorption Ratio (SAR)
      ii. electrical conductivity (EC),
      ii. mono-valent cation adsorption ratio levels, and
      iv water pH
      to discharge the brine retentates before their brine concentrations are too saline for soil adjustment and raising plants,
   e. adding at least one of the following to adjust the pH and calcium ion concentration of the discharged brine retentates:
      i. acid,
      ii. soluble compounds releasing calcium ions on liquid dissolution,
      iii. acid and soluble compounds releasing calcium ions on liquid dissolution, and
   f. applying the pH and calcium ion adjusted discharged brine retentates to soils until soil and soil water concentrations of sodium absorption ratio (SAR) are less than 15, electrical conductivity (EC) less than 2 dS $m^{-1}$ (m mho $cm^{-1}$), cation exchange capacity (CEC) less than 57.5 centimoles/kg, and a pH less than 8; the specific soil ratios and concentration levels selected for raising a particular plant and reduce soil bicarbonates/carbonates to increase soil porosity and improve water penetration.

2. A method for operating reverse osmosis membrane filter systems to recover water by using both the filtrate and brine retentate according to claim 1, wherein the injection point is a water stream entering microfiltration, ultrafiltration, nanofiltration and hypofiltration sequential membrane filters to provide membrane cleaning and maintenance benefits to all of the sequential membrane filters.

3. A method for operating reverse osmosis membrane filter systems to recover water by using both the filtrate and brine retentate according to claim 2, wherein the brine retentates from the last sequential filters are recycled to the beginning of the process.

4. A method for operating reverse osmosis membrane filter systems to recover water by using both the filtrate and brine retentate according to claim 1, wherein the pH is between 2 and 6.8 for land application to alkaline soils.

5. A method for operating reverse osmosis membrane filter systems to recover water by using both the filtrate and brine retentate according to claim 1, wherein the sulfurous acid has a free $SO_2$ and bisulfite ($HSO_3^-$) concentration, a pH level, and a dwell time sufficient to affect disinfection before land application.

6. A method for operating reverse osmosis membrane filter systems to recover water by using both the filtrate and brine retentate according to claim 1, wherein the injection point is within a water stream entering a fouled sequence of membrane filters.

7. A method for operating reverse osmosis membrane filter systems to recover water by using both the filtrate and brine retentate according to claim 1, wherein the sulfur dioxide is generated onsite and injected continuously into the water streams by passing either all or a portion of the water stream through a sulfur burner before undergoing reverse osmosis filtration.

8. A method for operating reverse osmosis membrane filter systems to recover water by using both the filtrate and brine retentate according to claim 1, wherein the pH of the filtrate is adjusted to prevent salts from precipitating out of solution.

9. A method for operating reverse osmosis membrane filter systems to recover water by using both the filtrate and brine retentate according to claim 8, wherein the pH of the retentate is acidified with sulfurous acid.

10. A method of cleaning and maintaining reverse osmosis membrane filters comprising:
    a. purging and rinsing the membrane filters with water,
    b. circulating a $SO_2$ water cleaning solution through the membrane filters at a concentration not adversely affecting the membrane filter's performance,
    c. removing the $SO_2$ water cleaning solution and rinsing the membrane filters,
    d. running a fresh water flux cycle to test for membrane filter cleanliness and productivity,
    e. returning the membrane filter to service or wet storage, and
    f. adding at least one of the following to the water cleaning solution before discharge to adjust the pH and calcium ion concentration of the cleaning solution to provide irrigation water for raising plants and adjust soil sodium absorption ratio (SAR) less than 15, electrical conductivity (EC) less than 2 dS (m mho $cm^{-1}$), cation exchange capacity (CEC) less than 57.5 centimoles/kg, and a pH less than 8:
       i. acid,
       ii. soluble compounds releasing calcium ions on liquid dissolution,
       iii. acid and soluble compounds releasing calcium ions on liquid dissolution;

the specific soil ratios and concentration levels selected for raising a particular plant and reduce soil bicarbonates/carbonates to increase soil porosity and improve water penetration.

11. A method of cleaning and maintaining reverse osmosis membrane filters according to claim 10, wherein the filters are made of hollow fibers, backwashing fouled reverse osmosis membrane filters with a cleansing solution containing sulfur dioxide in water at a concentration level sufficient to serve as a biocide decrease membrane fouling, and dissolve alkalinity scaling and iron deposit build-up on the reverse osmosis membrane filters.

12. A method of cleaning and maintaining reverse osmosis membrane filters according to claim 10, including:

a. removing fouled reverse osmosis membrane filters prior to backwashing and exposing the membrane filters to a cleaning solution containing sulfur dioxide in water at a concentration level sufficient to i. serve as a biocide to kill bacteria and other microorganisms causing membrane fouling, but at a level not adversely affecting the reverse osmosis membrane filter's performance capabilities, ii. dissolve alkalinity scaling, and iron deposit build-up on the reverse osmosis membrane filters, and b. reinstalling the cleaned reverse osmosis membrane filters from the cleansing solution for backwashing before reuse.

13. A method for cleaning and maintaining reverse osmosis membrane filters according to claim 10, wherein the sulfur dioxide gas acts as a scavenging molecule to react with oxygen gas to form sulfate ions to prevent membrane oxidation and deprive aerobic bacteria of oxygen.

* * * * *